United States Patent [19]

Iten

[11] 3,966,324

[45] June 29, 1976

[54] LASER DOPPLER ANEMOMETER

[75] Inventor: Paul D. Iten, Oberrohrdorf, Switzerland

[73] Assignee: BBC Brown Boveri & Company Limited, Baden, Switzerland

[22] Filed: Mar. 22, 1974

[21] Appl. No.: 453,969

[30] Foreign Application Priority Data

Apr. 18, 1973 Switzerland.................... 5580/73

[52] U.S. Cl. ............................... 356/106 R; 356/28
[51] Int. Cl.² ............................................ G01B 9/02
[58] Field of Search ............ 356/28, 102, 103, 104, 356/106 R; 350/169, 171, 252, 247; 250/574

[56] References Cited

UNITED STATES PATENTS

| | | | |
|---|---|---|---|
| 2,565,419 | 9/1951 | Aitcheson | 350/252 |
| 2,949,071 | 8/1960 | Foures | 350/301 |
| 3,723,004 | 3/1973 | Brayton | 356/28 |

*Primary Examiner*—John R. Corbin
*Assistant Examiner*—Conrad Clark
*Attorney, Agent, or Firm*—Pierce, Scheffler & Parker

[57] ABSTRACT

A laser doppler anemometer includes a source producing a laser beam which is then split into a plurality of partial radiation beams. A common optical image-forming system illuminates a measuring volume by the partial radiation beams and receives the back-scattered signal radiation therefrom which is directed into a detector, and a partially reflecting mirror arrangement is positioned in the common optical image-forming system for the purpose of masking out scattered signal radiation leaving the common optical image-forming system. The partially reflecting mirror arrangement can comprise two mirrors disposed plane parallel to each other, and it can include light transmissive elliptical rings or strips. A pinhole diaphragm, adjustable in a direction orthogonal to the optical axis of the detector and through which the back-scattered signal radiation passes is also provided and precedes the detector.

5 Claims, 13 Drawing Figures

LASER DOPPLER ANEMOMETER

BACKGROUND OF THE INVENTION

1. FIELD OF THE INVENTION

The invention relates to a laser Doppler anemometer having means for splitting the laser radiation into a plurality of partial bundles of rays, a common optical image-forming system for illuminating the measuring volume and for receiving the back-scattered signal radiation, and a detector provided in the optical path of the scattered signal radiation.

2. DESCRIPTION OF THE PRIOR ART

In a known laser Doppler anemometer of this type as disclosed in published German patent specification DT-OS No. 2 043 290, the light detector, for example a photomultiplier, including the associated optical system, lies on the optical axis of the image-forming system, behind the image-forming system, seen from the measuring volume. It is true that this arrangement renders possible a compact construction of the optical system, which is easy to adjust, but the receiving optical system associated with the detector, together with the associated operational controls and supporting members, is constricted in space, because the said parts are within an area bounded by the two illuminating beams. A further drawback of what is known consists in that the common image-forming system cannot be fully utilized.

In another known device (Proc. of 16th Int. Aerospace Instr. Symposium, May 1970, pages 14 – 26, particularly FIG. 7) the reverse method was adopted: There, the light scattered backwards from the measuring volume passes through the marginal zone of the illuminating and receiving lens. Thus this device also has the disadvantage indicated above. In addition, a further drawback is to be seen in the fact that the light source cannot lie on the optical axis of said lens, which leads to difficulties in adjustment on the one hand and does not permit rotation of the beam splitter for the measurement of various velocity components orthogonal to the direction of incidence of the illuminating beam, on the other hand.

SUMMARY OF THE INVENTION

It is the general object of the invention, to provide a laser Doppler anemometer which does not have the disadvantage of known systems and is distinguished by adjustment without problems, simple operation and optimum utilization of the luminous energy.

According to the invention, this problem is solved, in a laser Doppler anemometer of the type referred to hereinabove, in that a deflecting device, consisting of at least one partially reflecting mirror, is provided to limit the field of the scattered radiation leaving the common image-forming system.

More particularly, the improved laser Doppler anemometer device includes a beam splitter for splitting the laser radiation into a plurality of partial beams, a common optical image-forming system for illuminating the measuring volume with the partial beams and for receiving the back-scattered signal radiation, a detector located in the optical path of the scattered signal radiation, and a deflecting device comprising at least one partially reflecting mirror which masks out the scattered signal radiation leaving the common image-forming system.

It is a particular advantage to provide two such mirrors disposed plane parallel to one another. In this manner the light leaving the deflecting device travels parallel to the optical axis of the common image-forming system, as a result of which, construction and adjustment of the system are simplified considerably.

The spacing $h_1$ of the optical axes of the common image-forming system and of the optical system associated with the photo-detector, and the spacing $h_2$ of the two mirrors, as well as the angle of inclination $\alpha$ of the mirrors in relation to the optical axis of the common image-forming system are linked by the equation:

$$h_1 = h_2/\cos\alpha.$$

The mirror situated in the optical path of the illuminating beam preferably comprises at least one annular elliptical zone of high light transmittance (greater than 98%), which zone is surrounded by well reflecting areas. By using elliptical rings having an axial relationship determined by the angle of inclination $\alpha$ in accordance with the equation:

$$\sin\alpha = a/b$$

it becomes possible to be able to turn the beam splitter through any angle about the optical axis of the common image-forming system. In this manner, various velocity components orthogonal to said optical axis can be measured without any problems, solely by rotation of the beam splitter.

If the beam splitter is only to be rotated through fixed angles, for example in order to measure velocity components perpendicular to one another, then the mirror need only comprise two pairs of diametrically opposite zones of high light transmittance. If the spacing of the two illuminating beams is to be varied in addition, then said zones should be extended to form strips of appropriate length, in which case, however, a certain area round the centre of the mirror remains free, that is to say is made well reflecting.

In practice, a mirror has proved satisfactory which comprises a combination of elliptical rings and strips which pass through the elliptical rings in the direction of the major and minor axes of the ellipse.

The invention is explained in more detail below with reference to examples of embodiment illustrated in the drawings.

DESCRIPTION OF THE PREFERRED EMBODIMENTS

Figure 1:
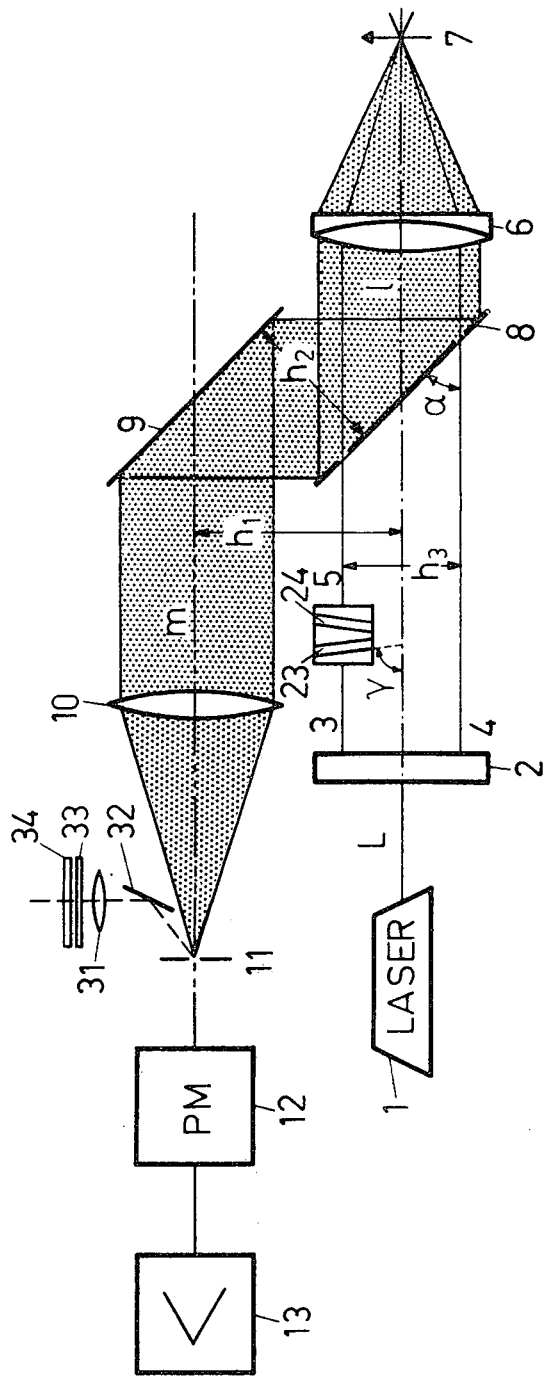
FIG. 1 shows an illuminating and receiving system for laser Doppler anemometers on the backscatter interference system.

The laser Doppler anemometer illustrated in FIG. 1 incorporates a so-called backscatter interference system. The light L produced by a laser 1 falls on a beam splitter 2. There the light is split into two partial beams 3 and 4 of equal intensity, extending symmetrically to the direction of incidence of the laser light. An optical filter 5 is disposed in the optical path of one partial beam e.g., the beam 3. The partial beams 3 and 4 are focussed on a measuring volume 7 by means of a lens 6 (in practice generally a whole lens system).

The light scattered backwards out of the measuring volume 7 passes through the same lens 6 onto a first mirror 8, which is inclined by the angle $\alpha$ in relation to the optical axis $l$ of this lens, is reflected there, and falls onto a second mirror 9 which is disposed plane parallel to the first mirror 8. Both mirrors are perpendicular to the plane of the drawing. Situated in the further optical path of the backscattered light is a further lens 10 (in practice likewise generally a whole lens system), which focusses the light on a pinhole diaphragm 11.

Disposed behind the pinhole diaphragm 11 is a photo-detector 12, which is followed by a pre-amplifier 13. The output of the pre-amplifier leads to a signal processing device, not illustrated. Such a signal processing device is described in more detail, for example in the German published patent specification DT-OS No. 2 051 442.

The optical axis $l$ of the lens 6 extends parallel to the optical axis $m$ of the lens 10. The two axes have the mutual spacing $h_1$. The spacing of the two mirrors 8, 9 is designated by $h_2$.

Figure 2A:
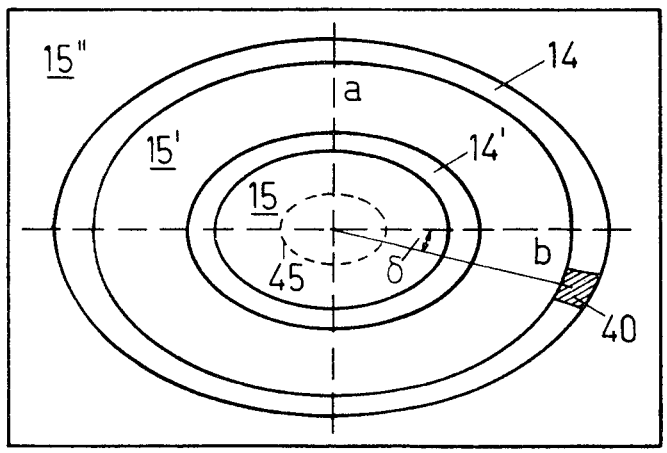
FIGS. 2a to 2c show plan views of various examples of embodiments of deflecting mirrors, FIG. 2a showing one with two elliptical rings, FIG. 2b one with strips perpendicular to one another, and FIG. 2c a combination of elliptical rings and strips.
Figure 2B:
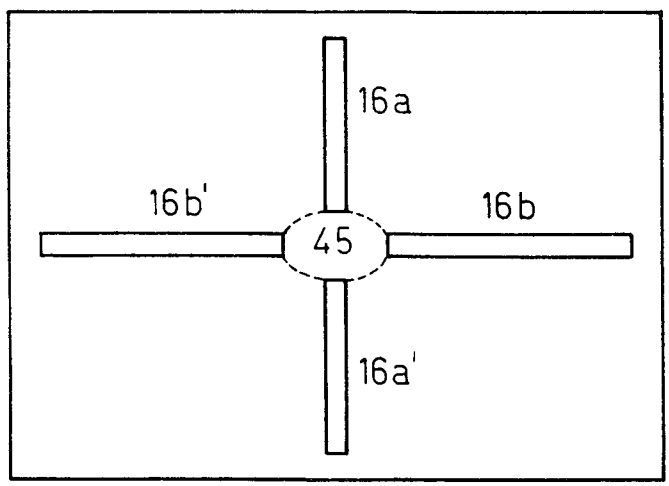
Figure 2C:
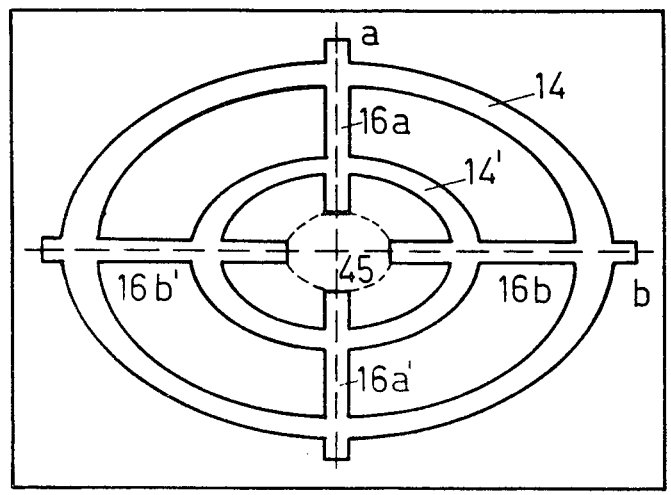

Plan views of various examples of embodiments of mirrors 8 are illustrated in FIGS. 2a–2c. The mirror as shown in FIG. 2a comprises two annular elliptical zones 14 and 14' having a high light transmittance (greater than 98%), which surround good reflective regions 15, 15' and 15'' (reflectivity greater than 98%). This satisfactory reflectivity can be achieved in known manner by dielectric mirror-coating. In the direction of the major axis $b$ of the ellipses, the rings have a width which is greater, by the reciprocal value of the sine of the angle of inclination of the mirrors, than in the direction of the minor axis $a$. Likewise, the axial ratio of the ellipses, which bound the rings, is determined by the angle of inclination $\alpha$ of the mirror 8 in relation to the optical axis $l$ of the lens 6 in accordance with the equation $$\sin \alpha = a/b.$$

The spacing of the elliptical rings depends on the required beam spacing $h_3$ (FIG. 1).

Without additional adjustment or an assembly work, a mirror thus constructed renders possible rotation of the beam splitter 2 about the optical axis $l$ of the lens 6, in order to be able to detect any components of the flow orthogonal to axis $l$ in this manner.

If optional angles of rotation are dispensed with, for example, if it is only desired to detect components of the flow field which are perpendicular to one another, then a mirror can be used such as is illustrated for example in FIG. 2b. In this mirror, strips 16a, 16b and 16a', 16b' of high light transmittance are provided, perpendicular to one another. These strips do not pass through the centre of the mirror, in order to obviate scattered-light losses.

The example of an embodiment of a deflecting mirror illustrated in FIG. 2c shows the combination of a mirror provided both with elliptical rings and with strips extending perpendicular to one another.

In all three examples of embodiments of deflecting mirrors, the strip or ring width in the direction of the minor axis $a$ of the ellipse amounts to substantially 3 mm. This increases in the direction of the major axis $b$ in accordance with the reciprocal value of the sine of the angle of inclination $\alpha$.

Now, in order to be able to utilize fully the advantages of the device according to the invention, the beam splitter 2 must satisfy the following requirements:

It must be easily exchangeable.

The beam spacing $h_3$ must not vary during the rotation about the optical axis $l$ of the lens 6, because otherwise the system constant of the measuring device also varies.

At every angle of rotation of the beam splitter, optical axis $l$ must form the median parallel to the two partial beams 3 and 4 leaving the beam splitter, and must do so independently of the axis of rotation of the beam splitter, because only in this manner does the focussing volume 7 not change its spatial position.

The examples of embodiments of beam splitters described below satisfy all the said requirements.

Figure 3:
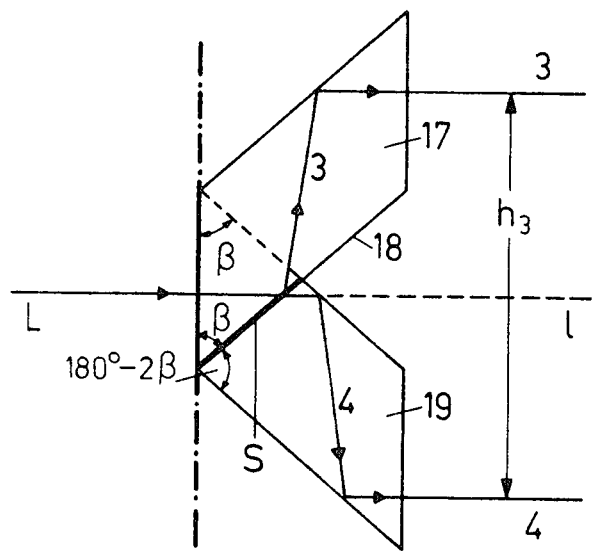
FIG. 3 shows a first example of an embodiment of a beam splitter with cemented i.e. glued on parallelogram prisms.

The beam splitter shown in FIG. 3 consists of two parallelogram prisms with the base angle $\beta$. The first prism 17 lies with one side face orthogonal to the direction of incidence of the laser light L. A second parallelogram prism 19, cut off at the angle $180° - 2\beta$ and having the same base angle $\beta$, is cemented, by this cut face, to the other side face 18, adjacent to the said side face and forming said angle $\beta$ therewith, either the cut face or the side face 18 having previously been 50% mirror-coated.

From the incident light L, this beam splitter produces two partial beams 3, 4 which extend precisely symmetrical to the direction of incidence and the median parallel of which coincides with the direction of incidence of the laser light L. The spacing $h_3$ between the light beams 3 and 4 is independent of the entry point of the laser light, within wide limits. The axis of rotation of the beam splitter and the direction of incidence of light must therefore not lie on one straight line. In addition, even inclinations of the beam splitter in relation to the direction of incidence of the laser light make no difference to the parallelism of the partial beams 3 and 4 leaving the beam splitter. Only the beam spacing $h_3$ varies with the cosine of the angle of inclination. An angular movement of the rotating stage carrying the beam splitter, of 1°, leads to an alteration in $h_3$ and hence in the system constant, of 0.2 per thousand.

Figure 4:
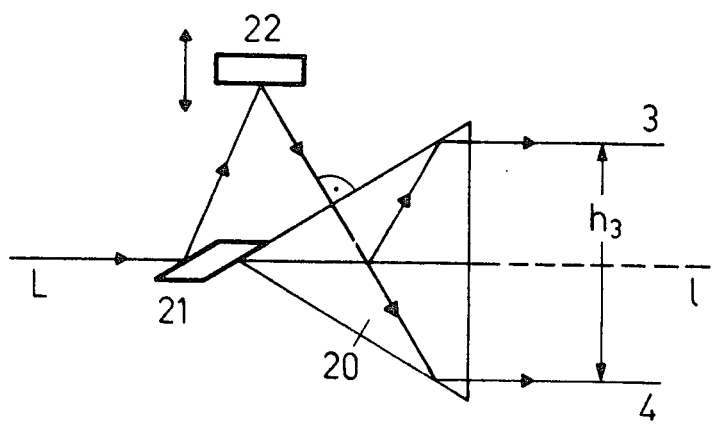
FIG. 4 shows a second example of an embodiment of a beam splitter with a Koster double prism.

In the beam splitter illustrated in FIG. 4, a Koster double prism 20 and two mirrors 21 and 22 are used. The incident laser light L is guided onto one side face of the double prism by means of the mirrors. The first mirror 21 is preferably secured to said side face. The second mirror 22 is movable perpendicular to the direction of incidence of the laser light L. In this manner, the spacing $h_3$ of the partial beams 3 and 4 can be varied.

Assuming that the direction of incidence of the light reflected by the mirror 22 and falling on said side face of the prism 20 is perpendicular to this side face, the partial beams 3 and 4 leave the beam splitter symmetrically and parallel to the direction of incidence of the laser light L.

Both the beam splitters described are simple to produce. The beam spacing $h_3$ can be adjusted simply and reproducibly. On rotation of the beam splitter about the axis determined by the direction of incidence, neither the beam spacing $h_3$ nor the symmetry between the two beams varies.

For many applications, it may be advisable to split the incident laser beam not only "geometrically" but also with regard to intensity, into two bundles of rays of different intensity. Thus in local oscillator systems, a splitting with regard to intensity: reference beam 1 to 5%, illuminating beam 99 to 95% is recommendable.

Such a splitting can be effected in two ways:
a. already in the beam splitter
b. by filters following the beam splitter.

With the possibility a), at least one of the reflecting faces of the beam splitter, as shown in FIG. 3 or FIG. 4, is mirror coated. This is indicated by way of example by the mirror-coating S in FIG. 3. If the side face 18 is 95% mirror-coated, then the partial beam 3 — apart from other insignificant losses — has an intensity which is higher by the factor 19 then the partial beam 4. If it is desired to achieve different intensity ratios with a single beam splitter, then the mirror coating S, FIG. 3, is made differently with regard to its reflectivity. Different intensity ratios between the two partial beams can then be effected by translation of the beam splitter orthogonal to the direction of incidence of the laser light. A wedge-shaped mirror-coating of the side face 18 even permits a continuous variation in said intensity ratio.

Whereas no appreciable light losses occur with the abovementioned measures, the use of optical filters involves these. For this reason, optical filters are used when comparatively minor differences in intensity have to be compensated, the reference radiation has to be lower in intensity by several orders of magnitude than the illuminating radiation, for example in local oscillator-backward systems, or only one beam splitter is available.

One example of an embodiment of an optical filter of the said kind is illustrated by way of example in FIG. 1. The filter 5 consists essentially of two plane parallel, exchangeable grey filter-glasses, so-called neutral-density filters, 23 and 24, which are inclined by the angle $\gamma$ or $180° - \gamma$ respectively in relation to the optical axis of the lens 6. Disturbing reflections are eliminated by the inclination. The parallel shift between incident beam and emergent beam, caused by the inclination is eliminated by the series connection of two, or an even-numbered multiplicity, of absorption filters. In this manner, the filter 5 can be removed without a re-adjustment of the optical arrangement having to be effected.

Figure 5:
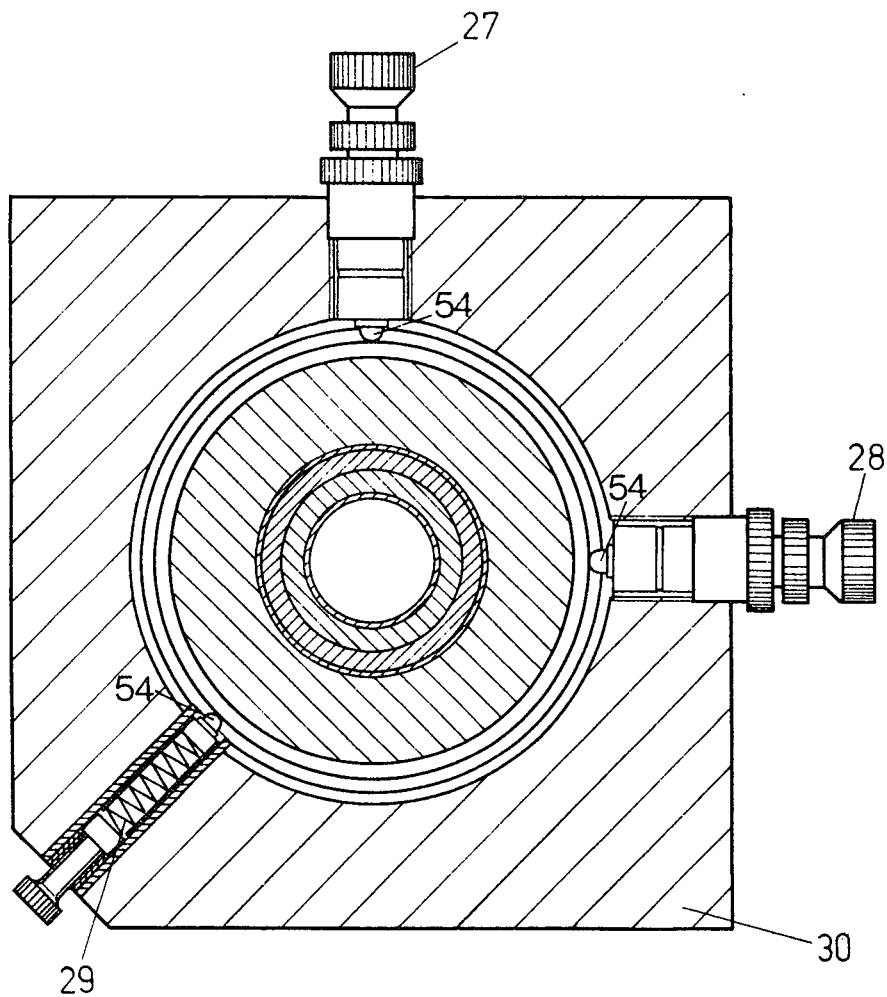
FIG. 5 shows an example of an embodiment of a pinhole diaphragm with associated adjusting device, in cross-section.

In laser Doppler anemometers, it is of great importance to be able to adjust the pinhole diaphragm, disposed between receiving optical system and photodetector, precisely and reproducibly, because the image of the measuring volume is formed on the diaphragm. During movements orthogonal to the optical axis of the receiving optical system, lens 10 in FIG. 1, the diaphragm must not move in the direction of the optical axis $m$ of this lens. A diaphragm satisfying the above-mentioned requirements is illustrated, including its adjusting device, in FIG. 5 (cross-section) and FIG. 6 (longitudinal section), by way of example.

The actual diaphragm 11 is exchangeable secured in a supporting ring 25. The supporting ring is provided with an encircling V-shaped groove 26, FIG. 6, at the outer circumference. The supporting ring is held in a frame 30 by means of two micrometer screws 27, 28, which are offset by 90° in relation to one another, and a spring 29 which is guided telescopically. The spring 29 lies on the angle bisectors of the axes of rotation of the micrometer screws.

The ends of the micrometer screws adjacent to the diaphragm aperture and the same ends of the telescopically guided spring are provided with balls 54, which run in the V-shaped groove 26.

By turning the micrometer screws 27 and 28, the diaphragm 11 can be sensitively adjusted in the plane orthogonal to the optical axis $m$ of the lens 10. Displacement in the direction of the axis $m$ is eliminated by the characteristic of the guiding of the balls in the groove 26.

In comparison with known adjusting devices, for example the adjusting device with plate guide known from the book "Fertigungs- und stoffgerechtes Gestalten in der Feinwerktechnik", Springer-Verlag Berlin/Heidelberg/New York, 1968, page 169, FIGS. 521 and 522, the adjusting device described above has the advantage of more simple production with considereably greater accuracy.

Figure 6:
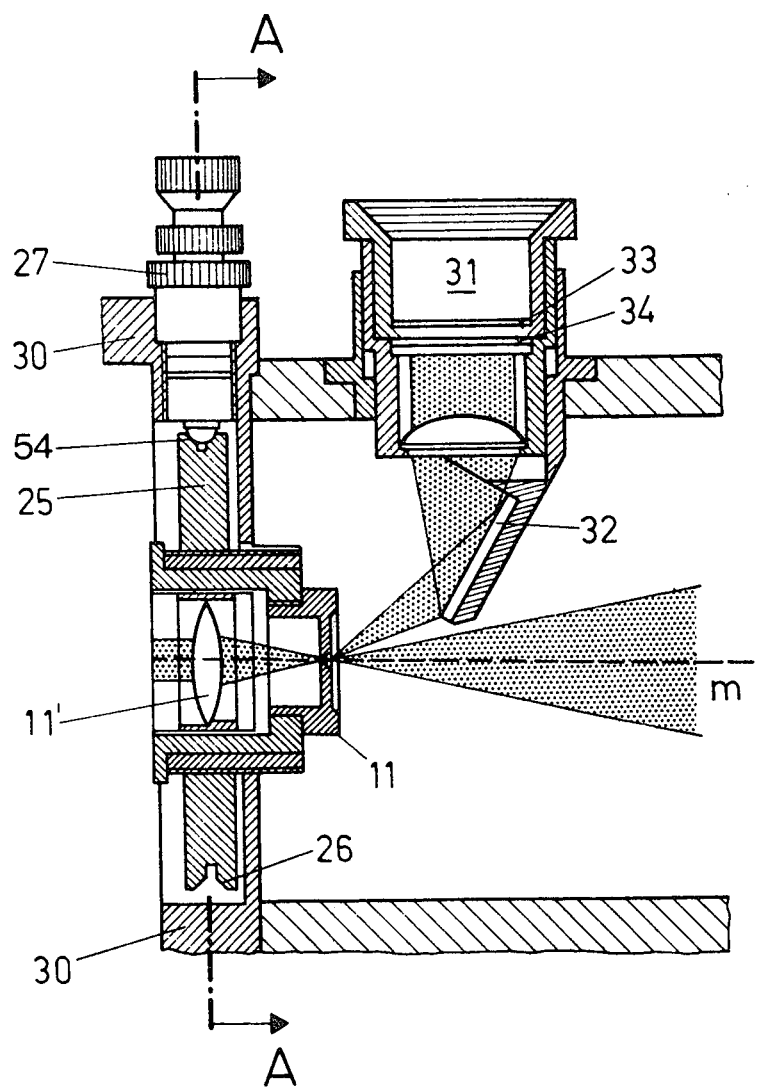
FIG. 6 shows a longitudinal section through the pinhole diaphragm of FIG. 5 and an additional observing eyepiece.

In addition, a lens 11' is provided behind the diaphragm 11 in FIG. 6. This lens is likewise exchangeably mounted in the supporting ring, for example inserted in an appropriate bore there. Together with the lens 10, the lens 11' forms a telescscope.

An accurate and rapid adjustment of the optical device is possible with the observing eyepiece 31 also shown in FIG. 6 and only indicated in FIG. 1. For this purpose, the eyepiece is provided with a mirror 32 which is inclined in relation to its optical axis. Thus the image of the measuring volume can be observed visually by means of the eyepiece and be formed on the pinhole diaphragm by adjusting the latter.

Two polarizers 33 and 34, which can be rotated in relation to one another, are provided in the optical path between mirror 32 and the eye of the observer. These serve to adapt the light conditions in the measuring volume to the sensitivity of the eye, which is an advantage, particularly with strongly reflecting objects to be measured.

Figure 7:
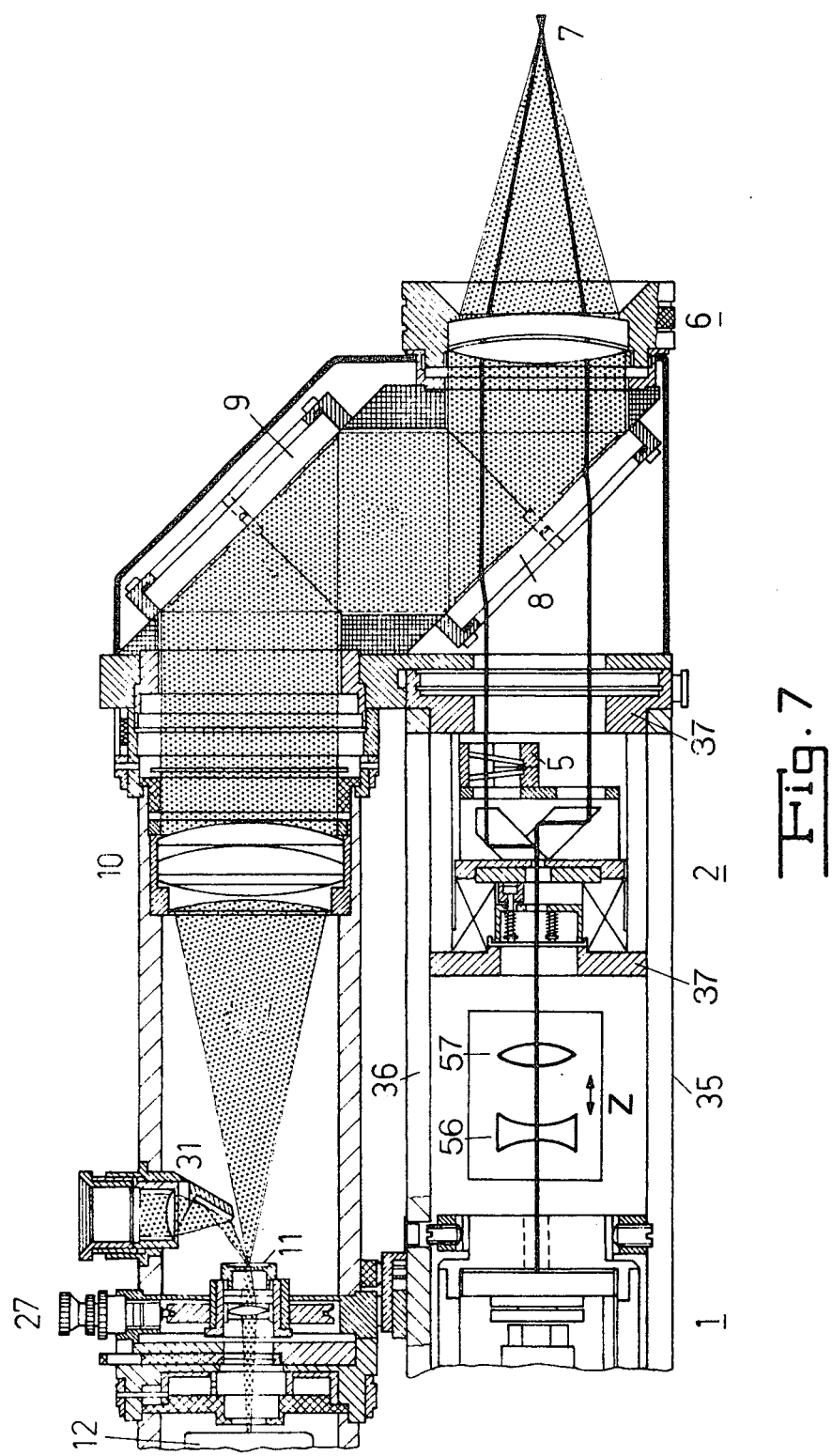
FIG. 7 shows an example of a practical embodiment of the invention in the form of a laser Doppler anemometer on the backscatter interference system.

A first example of a practical form of embodiment of the invention is illustrated in FIG. 7. The several components denoted by the same reference numerals as in FIGS. 1 to 6 are accommodated, for easy exchange, in a common housing. These include the laser source 1, beam splitter 2, filter 5, the deflecting device consisting of the mirrors 8 and 9 and the associated holding device, the common illuminating and receiving optical system 6, lens 10, pinhole diaphragm 11 with its adjusting device, eyepiece 31 which forms a mechanical unit with the housing of lens 10, photo-detector 12 and pre-amplifier 13.

The laser, beam splitter and filter components 1, 2 and 5, are disposed on a first supporting plate 35, snap connections or magnetic holders being used where technically acceptable. In the stage above, the lens 10, pinhole diaphragm 11, eyepiece 31, photo-detector 12 and the pre-amplifier 13 are disposed in the same manner, for easy exhange, on a second mounting plate 36. The two mounting plates are supported in relation to one another through spacing members 37.

The deflecting device consisting of the mirrors 8 and 9 and associated holding device is placed on the end of the lower mounting plate 35, remote from the laser 1. The positive connection between deflecting unit and mounting plate 35 is effected through a dovetail guide extending perpendicular to the mounting plate, or a bayonet catch. The illuminating and receiving optical system 6 is connected to the deflecting device in the manner of an interchangeable objective, for example by means of a bayonet catch. In this manner, another deflecting device and/or lenses or lens systems having a different focal length and/or aperture can be used in a simple manner.

Each of the above mentioned detachable connections is naturally made with the precision usual for optical measuring instruments, known techniques being used throughout, so that it should be superfluous to go, in further detail, into constructional details of these detachable connections. A detailed description of the device shown in FIG. 7 is likewise dispensed with, because an understanding thereof necessarily results from what has been described hitherto and from the drawing.

Figure 8:
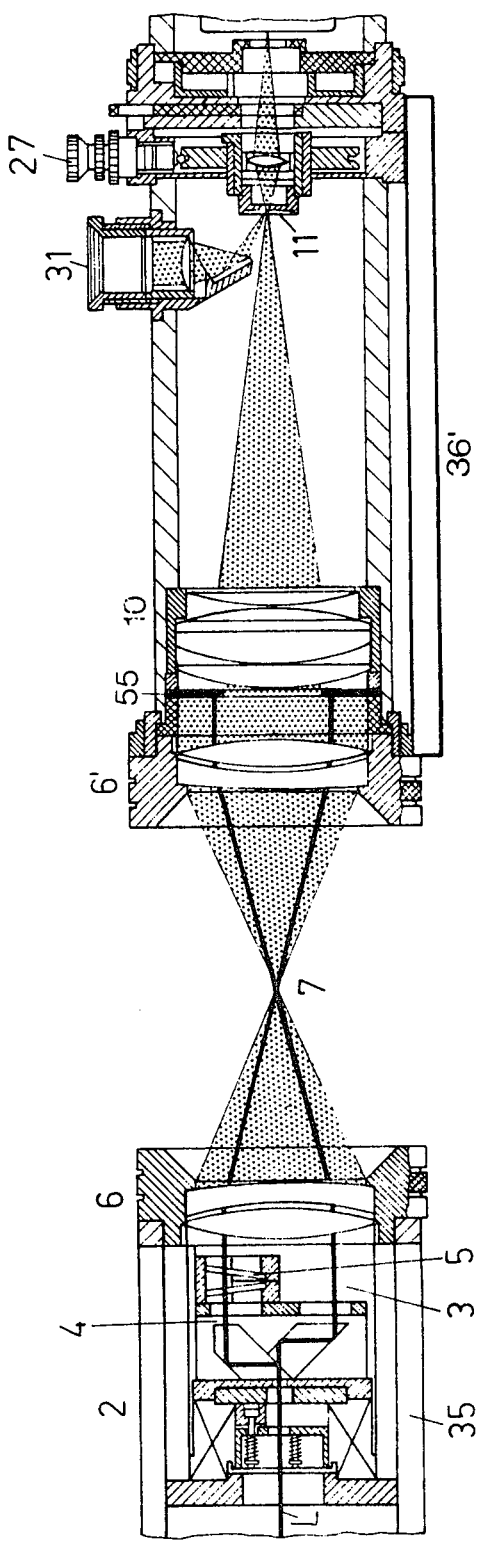
FIG. 8 shows a further example of an embodiment, modified in relation to the device shown in FIG. 7, on the forward-scatter interference system.

The great advantages of this module form of construction become particularly obvious when certain parts have to be exchanged or parts having different optical characteristics inserted, for example other beam splitters, other filters, another deflecting device, or other illuminating and receiving optical systems. It is a further advantage of this system that individual modules can be used separately. This is illustrated in FIG. 8, which shows a forward-scatter interference system.

The modules mounted on the upper mounting plate 36, lens 10, pinhole diaphragm 11, eyepiece 31, photo-detector 12 and preamplifier 13 are removed and disposed at the "other side" of the medium on a second mounting plate 36' corresponding to the mounting plate 36. The deflecting device, which is not needed for this mode of operation, has been removed. It is replaced by the lens 6. For this purpose, the spacing member 37 adjacent to the medium comprises an appropriate holding device which is comparable with the above mentioned holding device of the deflecting device. Whereas, in the arrangement shown in FIG. 7, the lens 6 fulfills a double function (simultaneously illuminating and receiving optical system), a further lens 6' must now precede the lens 10, with forward scatter.

For this purpose, the end of the housing of the lens 10 remote from the pinhole diaphragm is provided with a suitable holding device for the lens 6'. In order to achieve simple optical conditions, it is advisable to use, for the lenses 6 and 6', those of the same type, that is to say having the same possibility for mechanical connection, the same focal length and aperture.

A diaphragm 55 is provided between lens 6' and lens 10 to mask the two illuminating beams after passage through the medium 7. Provided the medium permits it, both mounting plates 35 and 36' are secured to a common base plate. If, in addition, the base plate also comprises suitable guide members, not illustrated, comparable with those of an optical bench, then the adjustment of the system for forward scatter is as simple as that for backscatter.

Without a common base plate, the optical axes of the lenses 6 and 6' merely have to be brought into a straight line - apart from the focussing of the lenses 6 and 6' respectively and the formation of the image of the measuring volume on the pinhole diaphragm 11.

The system for backscatter illustrated in FIGS. 1 and 7 can be converted into a local oscillator-backward-system in a simple manner. This is illustrated by way of example in FIG. 9.

The incident laser light beam L is split into two partial beams 3, 4 in the beam splitter 2, the partial beam 3 comprising 95% of the intensity of the incident light and the partial beam 4, 5%. This splitting as regards intensity has already been described in connection with the beam splitter illustrated in FIG. 3.

The partial beam 3 passes through the region of the deflecting mirror 8 which is not mirror-coated and is focused on the measuring volume 7 by means of the lens 6. A proportion of the backscattered light from the measuring volume passes through the lens 6 and the diaphragm 39 onto a region of the mirror 8 which is well mirror-coated (reflectivity more than 95%). There it unites with the reference beam 4 deflected by means of a further mirror 41.

If it is desired to realize both a backscatter interference system and a local oscillator-backward-system with a single deflecting mirror 8, then it is advisable to provide a mirror which is provided with elliptical rings and which additionally comprises a well mirror-coated zone 40 on the (light-transmissive) elliptical ring, outside the principal axes. This is illustrated by way of example in FIG. 2a.

Figure 9:
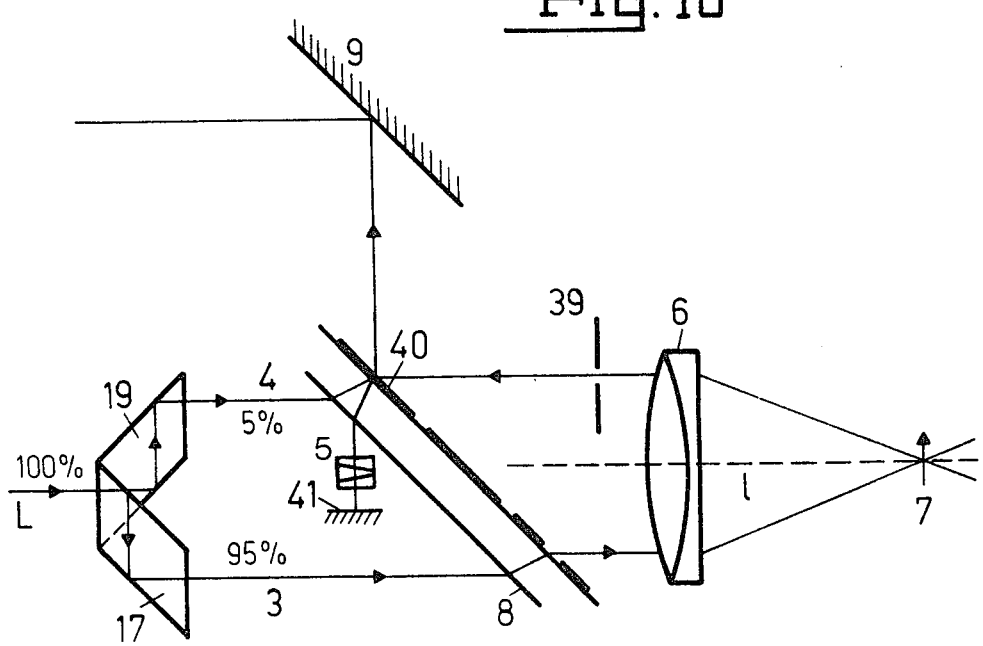
FIG. 9 shows a diagrammatical illustration of a further modification of the device shown in FIG. 7, for measuring both on the backscatter or forward-scatter interference system and on the local-oscillator backward system.

The changeover from the one mode of operation to the other is then effected merely by turning the beam splitter 2 about the axis determined by the direction of incidence of the laser light L, through the angle $\delta$ (FIG. 2a) and by inserting the diaphragm 39 (FIG. 9).

Thus both orthogonal velocity components and the velocity component in the direction of the optical axis $l$ of the lens 6 can be detected with a single system, and can be detected in succession without the optical system having to be re-adjusted.

Figure 10:
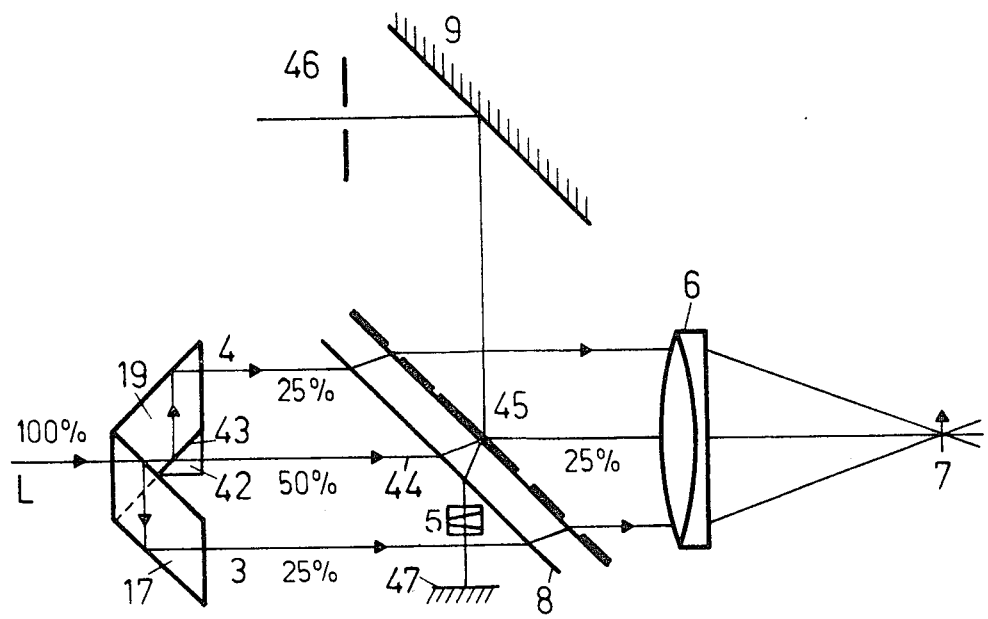
FIG. 10 shows a device comparable to that illustrated in FIG. 9, with three illuminating beams, which renders possible the simultaneous measurement of all three velocity components of a flow field.

Even the simultaneous measurement of two velocity components, namely the component extending in the direction of the optical axis $l$ of the lens 6 (z-component) and a component extending orthogonal to this, is possible with the device illustrated in FIG. 10. The third component can then be measured by rotating the beam splitter 2 about the axis $l$. This device is a three-beam illuminating system for a local oscillator backward-and-forward-interference system.

The beam splitter 2 differs from the one illustrated in FIG. 3 by an additional wedge prism 42 which has been cemented onto the one side face of the (cut-off) parallelogram prism 19. In this case, that prism which has to be cut off in the course of producing the beam splitter shown in FIG. 3 may be used. The original side face 18 of the parallelogram prism 17 is 25% mirror-coated, the side face 43 of the parallelogram-prism 19 to which the wedge prism 42 is cemented is 33⅓% mirror-coated, while the side faces situated opposite said side faces are fully mirror-coated. If the angle at which the partial beams 3, 4 fall on the last-mentioned side faces is equal to or smaller than the angle of total reflection, then the mirror-coating can be omitted. As can easily be seen, this angle of incidence is dependent on the base angle $\beta$ of the parallelogram prisms 17, 19. With the degrees of mirror-coating mentioned above, the three partial beams 3, 44, 4 have the intensity ratio 25: 50 : 25, which represents an optimum for this device.

The deflecting device, that is to say, in particular, the mirror 8, does not have to be altered for this mode of operation. The elliptical zone in the centre of the mirror 8, which is shown in FIG. 10 and also in FIGS. 2a to 2c and which is designated by 45, is already present. It is advisable, however, to mirror-coat 50% of the zone 45.

Now in order that no important light losses may occur with the backscatter-interference system mode of operation — it is known that the variation in intensity of the backscattered light has a substantially Gaussian distribution with an intensity maximum on the optical axis $l$ of the lens 6 — the 50% mirror-coating is effected only in a central region of the elliptical zone 45, preferably about 3.5 mm in diameter in the direction of the major axis $b$ of the ellipse.

As mentioned at the beginning, the beam splitter 2 is mounted, for the purpose of sequential measurement of two velocity components orthogonal to the optical axis of the lens 6, for rotation about this axis.

With regard to the forward scatter-interference-system, wherein the partial beams 3 and 4 are used to illuminate the measuring volume, the device shown in FIG. 10 does not differ in principle from the device illustrated in FIG. 8 — the modules disposed at the "other side" of the measuring volume, lens 6', lens 10, diaphragm 11 etc, were merely omitted in FIG. 10 for reasons of simplicity.

The mode of operation of the device during operation as a local oscillator-backward-system is as follows:

The partial beam 44 passes through the 30% mirror-coated zone 45 of the mirror 8 and is focussed on the measuring volume 7. Of the backscattered light from the measuring volume, the proportion situated close to the optical axis of the lens 6 is deflected onto the second deflecting mirror 9 by means of the deflecting mirror 8 (there the zone 45.) A pin-hole diaphragm 46 in the optical path between the second mirror 9 and the lens 10 (not illustrated) masks stray light not needed for the measurement. Some of the beam 44 incident on the reflecting zone 45 is reflected as a result of the 50% mirror-coating and falls on a further mirror 47, the reflectivity of which is such that the beam leaving the mirror 8 in the direction of the mirror 9 and serving as a reference beam comprises about 1 to 5 parts per thousand of the illuminating beam leaving the mirror 8 in the direction of the optical axis $l$ of the lens 6. The reflectivity should therefore be considerably less then 1% which can be realized by dielectric de-reflection is known manner.

Suitable neutral-density filters may also be introduced into the optical path between mirror 8 and mirror 47 for the fine adjustment of the intensity ratios, the construction of which resembles that of the filter 5 (in FIGS. 1 or 7). This possibility is illustrated both in the device shown in FIG. 9 and in that shown in FIG. 10, in each of which there is provided a filter designated by the reference numeral 5.

Attention may also be drawn to the fact that the system described above is also suitable, in a slightly modified form, for simultaneous measurement both by the local oscillator-back-ward-system and by the back-scatter-interference system:

If the mirror 9 is provided with an opening in the region of the point of incidence of the backscattered with the scattered beam united with the reference beam, or the good mirror-coating is removed there, and a further receiving system consisting of lens, photodetector and pre-amplifier provided behind the point of emergence of the light (the diaphragm 46 is then omitted), then this device can be used for the simultaneous measurement of two velocity components.

If two beam splitters as shown in FIG. 10 are connected in series, and turned through 90° in relation to one another, the simultaneous measurement of all three velocity components is even possible:

The z-component is detected by means of the local oscillator-backward-system, and the other components are determined by means of the forward scatter and backscatter-interference systems respectively. It is then obvious that three separate receiving systems, including processing devices are necessary.

In both the examples of embodiment illustrated in FIG. 9 and 10, including the modifications indicated, the adjustment of the optical system is very simple. It is equal, in its simplicity to the devices described in connection with FIGS. 7 and 8. Only the adjustment of the mirrors 41 and 47 respectively has to be added to this.

Figure 11:
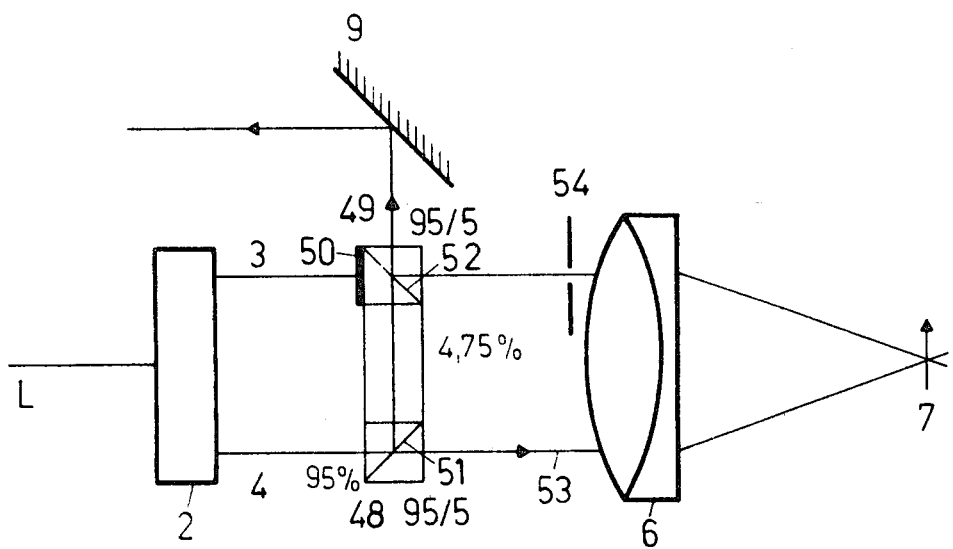
FIG. 11 shows a further modification of the device illustrated in FIG. 9, wherein the deflecting mirror is replaced by a functionally equivalent pair of beam-splitter cubes.

The design of a laser Doppler anemometer illustrated by way of example in FIG. 11 is a modification of the design shown in FIG. 9. The deflecting mirror 8 is here replaced by a deflecting or superimposing device consisting of two conventional beam-splitter cubes 48 and 49. The partial beam 3, which is not needed here, is masked by a mask 50. As a beam splitter 2, one such as in the case of the arrangement shown in FIG. 9 (17, 19) can be used. The joint faces 51 and 52 of the beam-splitter cubes 48, 49 are 5 and 95% mirror-coated respectively. Then the illuminating beam 53 has 95% of the intensity of the light incident on the beam-splitter cube 48, and the reference beam leaving the beam-splitter cube 49 has about 2.4 per thousand of the intensity of the irradiated light, which is fully sufficient for local oscillator-backward-systems.

A pinhole diaphragm 54 is provided in the optical path of the light scattered back from the measuring volume, in order to mask out interfering light.

In all types of laser Doppler anemometers, whether they be those that work on the interference or on the local oscillator system, a systematic measuring error occurs, the cause of which lies in the nature of the production of the illuminating beam:

The caustic or the envelope of the beam profile of a laser beam is, for the usual $TEM_{oo}$ mode, a hyperboloid of revolution, with an opening angle of the asymptotes, minimum spot radius, and locus of the minimum spot radius which is determined by the resonator geometry of the laser. The formation of the image of such Gaussian modes by spherical lenses or mirrors again produces Gaussian modes, but with an altered minimum spot radius elsewhere (c.f. "Laser und angewandte Strahlentechnik", No. 1, pages 55, 56, 1970).

In order to eliminate the measuring errors resulting therefrom, which may amount to up to 5%, it has already been proposed to bring the locus of the minimum spot radius of the laser light illuminating the measuring volume substantially into coincidence with the centre of the measuring volume by means of additional image-forming systems interposed between laser and measured object or measuring volume (c.f. German published patent specification DT-OS No. 22 06 520.9). One of the possibilities described there consists in making the virtual distance between laser and measuring volume adjustable, for example by means of a combination of a convex and a concave lens. A further possibility consists in varying the real distance.

Both methods of eliminating the above-mentioned measuring error can, of course, be used in all the examples of embodiment described above, as shown in FIGS. 1 and 7 to 11. Thus in the form of embodiment in FIG. 7, for example, a free space is provided inside the housing between laser 1 and beam splitter 2, in which a compensation device Z can be inserted. The latter consists, for example, of a combination of a concave lens 56 and a convex lens 57, the optical axes of which coincide with the direction of incidence of the laser light L. Both lenses can be displaced relatively to one another in the direction of this axis. Further details are described in detail in the abovementioned laid-open German patent application.

I claim:

1. A laser Doppler anemometer comprising a source providing a laser radiation beam, means for splitting said laser radiation beam into a plurality of partial radiation beams, a common optical image-forming system for illuminating a measuring volume by said partial radiation beams and for receiving the backscattered signal radiation therefrom, a detector located in the optical path of said back-scattered signal radiation, and a deflecting device comprising at least one partially reflecting mirror means positioned in said common optical image-forming system for directing at least one part of the scattered signal radiation leaving said common optical image-forming system to a pinhole diaphragm, wherein said partially reflecting mirror means is constituted by two mirrors disposed plane parallel to each other and wherein said partially reflecting mirror means include light-transmissive elliptical rings.

2. A laser Doppler anemometer as defined in claim 1 wherein said partially reflecting mirror means include additionally light-transmissive strips.

3. A laser Doppler anemometer as defined in claim 1 wherein the angle of inclination of the mirror means in relation to the optical axis of the common optical image-forming system is adjustable.

4. A laser Doppler anemometer as defined in claim 1 and which further includes means for adjusting said pinhole diaphragm in a direction orthogonal to the axis of said detector and which comprises a supporting ring in which said pinhole diaphragm is mounted, said supporting ring including a V-shaped groove at its outer periphery encircling said diaphragm, and a frame in which said supporting ring is adjustably mounted in relation thereto by means of a pair of micrometer screws and a telescopically guided spring arranged in circumferentially spaced relation about the periphery of said V-shaped groove, the inner ends of said micrometer screws and spring each being provided with a ball engaged with the flanks of said groove.

5. A laser Doppler anemometer as defined in claim 4 and which further includes a lens mounted in said supporting ring behind said pinhole diaphragm, said auxiliary lens together with a preceding lens in the optical path of the back-scattered signal radiation forming a telescope.

* * * * *